United States Patent [19]
Yamamoto et al.

[11] Patent Number: 6,072,277
[45] Date of Patent: Jun. 6, 2000

[54] HEADLIGHT DEVICE HAVING HIGH VOLTAGE ELECTRIC-DISCHARGE LAMP

[75] Inventors: Noboru Yamamoto, Kariya; Tomoyuki Funayama, Toyota; Motomu Imaizumi, Nishikamo-gun, all of Japan

[73] Assignee: Denso Corporation, Kariya, Japan

[21] Appl. No.: 08/920,008

[22] Filed: Aug. 29, 1997

[30] Foreign Application Priority Data

Aug. 30, 1996 [JP] Japan .................................. 8-230911

[51] Int. Cl.7 .............................. B60Q 1/00; F21V 7/00
[52] U.S. Cl. ........................... 315/82; 315/77; 362/267; 362/344; 307/10.8
[58] Field of Search .................................. 315/82, 77, 80; 362/61, 310, 267, 309, 344; 307/10.8, 9.1

[56] References Cited

U.S. PATENT DOCUMENTS

| | | | |
|---|---|---|---|
| 5,343,370 | 8/1994 | Ohashi et al. | 362/61 |
| 5,597,232 | 1/1997 | Ohashi et al. | 362/61 |
| 5,611,612 | 3/1997 | Choji et al. | 362/61 |
| 5,689,157 | 11/1997 | Jitsukata et al. | 315/85 |
| 5,879,073 | 3/1999 | Hori et al. | 362/344 |

FOREIGN PATENT DOCUMENTS

| | | |
|---|---|---|
| 61-165747 | 7/1986 | Japan . |
| 5-101703 | 4/1993 | Japan . |
| 5-89702 | 4/1993 | Japan . |
| 7-6603 | 1/1995 | Japan . |

*Primary Examiner*—Don Wong
*Assistant Examiner*—Wilson Lee
*Attorney, Agent, or Firm*—Pillsbury Madison & Sutro LLP

[57] ABSTRACT

A high voltage electric-discharge lamp is used as a light source of a headlight device for use in an automobile vehicle. Light from the discharge lamp is reflected on the curved surface of a reflector disposed at a back side of the discharge lamp, and projected forward. To reduce high frequency electromagnetic noises emitted forward from the device, which interfere with radios and televisions mounted on a vehicle driven ahead, a shade to intercept light emitted directly forward from the discharge lamp is disposed in front of the discharge lamp, and the shade is grounded. To further enhance noise reduction effects, a second grounding passage is provided. The second grounding passage is formed by grounding terminals attached to the shade and a wire connecting the terminals to the ground. Other components constituting the headlight device may be also grounded to secure a higher shielding effect. The electromagnetic noises interfering with radios and televisions mounted on a vehicle driving ahead are sufficiently reduced to a harmless level.

13 Claims, 3 Drawing Sheets

HEADLIGHT DEVICE HAVING HIGH VOLTAGE ELECTRIC-DISCHARGE LAMP

CROSS-REFERENCE TO RELATED APPLICATION

This application is based upon and claims benefit of priority of Japanese Patent Application No. Hei-8-230911 filed on Aug. 30, 1996, the content of which is incorporated herein by reference.

BACKGROUND OF THE INVENTION

1. Field of the Invention

The present invention relates to a headlight device having a high voltage electric-discharge lamp for use in an automobile.

2. Description of Related Art

Recently, a high voltage electric-discharge lamp is coming in use as a light source for an automobile headlight device. The high voltage electric-discharge lamp (hereinafter referred to as a discharge lamp) emits light from a light source generated by arc-discharge powered by a square alternating voltage or a direct current voltage. In case the discharge lamp is powered by an alternating voltage, electromagnetic noises are generated every time polarities of the voltage alternate. In case the discharge lamp is driven by a direct current voltage, the noises are generated at a time when the discharge lamp is turned on. Because the electromagnetic noises have a frequency band of several-tens MHz, they are harmful not only to a radio receiver and a television set mounted on a vehicle equipped with the discharge lamp but also to those mounted on other vehicles driving ahead of the vehicle.

SUMMARY OF THE INVENTION

The present invention has been made in view of the above-mentioned problem, and an object of the present invention is to provide a headlight device having a high voltage electric-discharge lamp, in which the electromagnetic noises interfering with radios and televisions mounted on a vehicle and especially with those mounted on other vehicles driving ahead are reduced to a harmless level.

The headlight device is composed of a high voltage electric-discharge lamp which is energized by a control circuit through a connector attached to the discharge lamp, a reflector having a curved concave surface for reflecting light from the discharge lamp thereon and emitting the reflected light forward, and a shade disposed in front of the discharge lamp for intercepting light emitted directly forward from the discharge lamp. Since the discharge lamp emits high frequency electromagnetic noises in addition to visible light to be projected forward, the noises have to be reduced to a harmless level. According to the present invention, the shade for intercepting light emitted directly forward from the discharge lamp is grounded. Therefore, the noises are shielded by the shade and reduced to a harmless level.

To further enhance the shielding effects, a second grounding passage is provided in addition to grounding the shade. Wire-like thin grounding terminals extending backward from a support plate for mounting the shade on the reflector are provided, and the grounding terminals are grounded through a wire, thus forming the second grounding passage. The grounding terminals are disposed so that they do not interfere with the light from the discharge lamp. The grounding terminals may be made to stick out directly from the shade.

The reflector is made of a metallic material or a resin material with a surface covered by a metallic material. The reflector is also grounded to further improve shielding effects for the noises. The connector attached to the discharge lamp is covered with a grounded metal cover to shield the electromagnetic noises otherwise emitted outside therefrom. Also, the control circuit is contained in a grounded metal case, and a wire connecting the control circuit to the connector is covered with a metallic shielding sleeve which is grounded. Thus, the electromagnetic noises are well shielded and the noise level emitted forward from the headlight device is reduced to a harmless level.

Other objects and features of the present invention will become more readily apparent from a better understanding of the preferred embodiment described below with reference to the following drawings.

DETAILED DESCRIPTION OF THE PREFERRED EMBODIMENT

Figure 1:
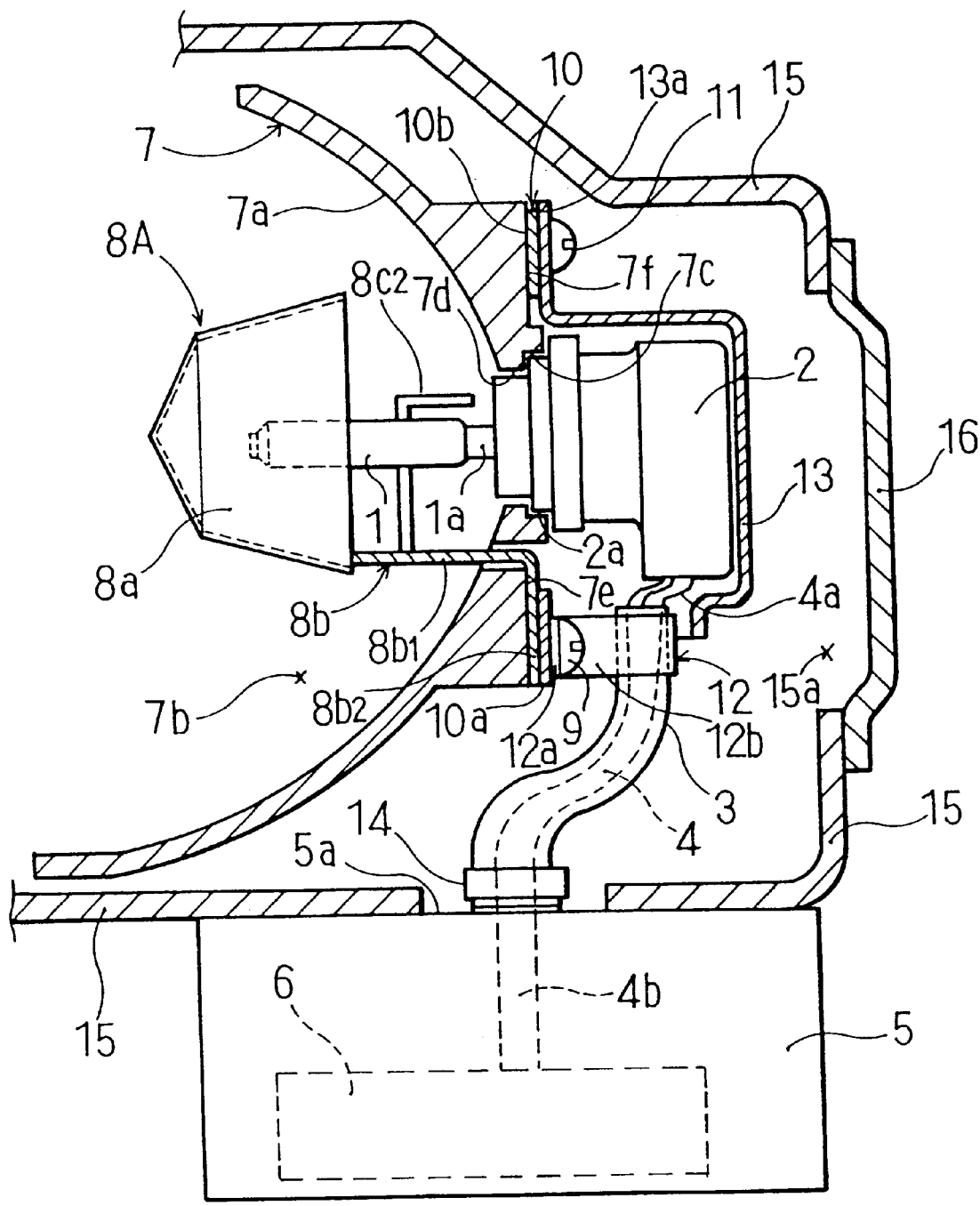
FIG. 1 is a cross-sectional view showing a whole structure of a headlight device as an embodiment according to the present invention.
Figure 2:
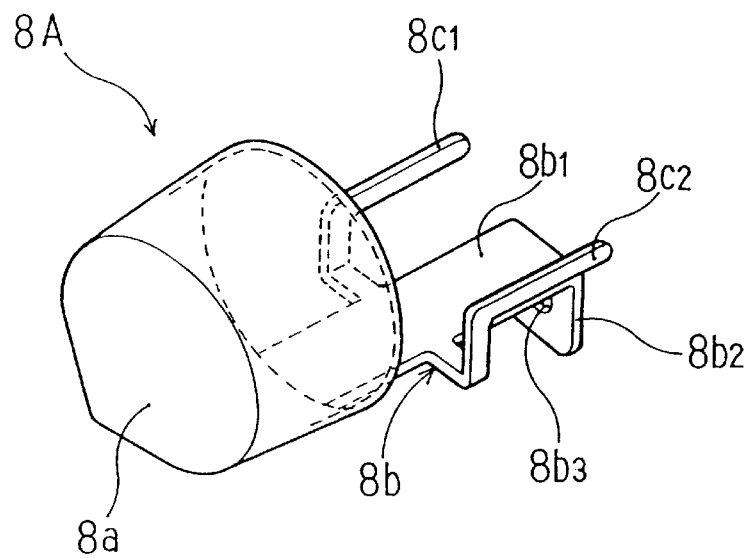
FIG. 2 is a perspective view showing a shade used in the headlight device shown in FIG. 1.

Referring to FIGS. 1 and 2, an embodiment according to the present invention will be described. FIG. 1 shows a whole structure of the headlight device and FIG. 2 shows a shade used in the headlight device.

A high voltage electric-discharge lamp 1 having an elongated cylindrical shape is installed at a center of the device. Behind the discharge lamp 1, a connector 2 is disposed and electrically connected to the discharge lamp 1 at its back end 1a. A wiring cable 4 covered by a metallic shielding sleeve 3 is connected to the connector 2 at its one end 4a. The other end 4b of the wiring cable 4 is connected to a control circuit 6 contained in a metallic case 5. The control circuit 6 includes a DC/DC converter for boosting voltage (not shown in the drawing), and controls electric power to be supplied to the discharge lamp 1. The power supplied from the control circuit 6 to the discharge lamp 1 may be either an alternating square voltage or a direct current voltage. The discharge lamp 1 is located in a space 7b in front of a curved front surface 7a of a reflector 7. The front surface 7a of the reflector 7 is a so called free curvature surface which reflects light from the discharge lamp 1 and projects the reflected light forward with a predetermined light distribution pattern. The reflector may be made of either a metallic material or a resin material a front surface of which is covered by, for example, a sputtered aluminum film. At the center portion of the reflector 7, a through-hole 7d having an internal thread 7c is formed. The connector 2 has an external thread 2a at its front portion. The connector 2 is connected to the reflector 7 by screwing the external thread 2a into the internal thread 7c. The connector 2 and the reflector 7 may be connected by any other means.

A front portion of the discharge lamp 1 is covered by a conical surface 8a of a metallic shade 8A. The conical surface 8a interrupts light emitted forward from the discharge lamp 1. Only the light reflected on the curved surface 7a of the reflector 7 is projected forward, and accordingly the light distribution pattern projected forward is exclusively determined by the curvature of the front surface 7a. The shade 8a also interrupts electromagnetic noises emitted forward from the discharge lamp 1. As shown in FIG. 2, a support plate 8b extends from a bottom portion of the conical surface 8a. The support plate 8b is composed of a base plate $8b_1$ and an angled plate $8b_2$ bent downward from the base plate $8b_1$. A pair of grounding terminals $8c_1$ and $8c_2$ are extended from a mid portion of the base plate 8b, and bent backwardly. The grounding terminals $8c_1$ and $8c_2$ are connected electrically to a metal ring plate 10 attached to a back surface 7f and 7e of the reflector 7 by a connecting wire (not shown in the drawing).

The shade 8A is fixed to the reflector 7 at the back surface 7e by a screw 9. The angled plate $8b_2$ of the support plate 8b has a hole $8b_3$, through which the screw 9 is inserted, and the angled plate $8b_2$ is fixed to the back surface 7e of the reflector 7. Therefore, the support plate 8b is connected electrically to the reflector 7. A metal ring plate 10 is also fixed to the back surface 7e and 7f of the reflector 7 by screws 9 and 11. Accordingly, the metal ring plate 10 is connected electrically to the reflector 7.

A metal clip 12 is fixed to the back surface 7e of the reflector 7 via the metal ring plate 10 by the screw 9. The clip 12 is connected electrically to the metal ring plate 10. A holding portion 12b of the metal clip 12 holds the wiring cable 4 covered by the metallic shielding sleeve 3. Therefore, the clip 12 and the metallic shielding sleeve 3 are electrically connected. At the upper back surface 7f of the reflector 7, a metallic cover 13 which covers the connector 2 is fixed to the reflector by the screw 11. The cover 13 is also connected electrically to the reflector 7. The metallic cover 13 is grounded to a vehicle body by a connecting member (not shown in the drawing) such as a wire. Since the metallic shielding sleeve 3 is fixed to a metal case 5 by a band 14, the metallic shielding sleeve 3 is electrically connected to the metal case 5. A lamp housing 15 made of resin is mounted on an upper surface 5a of the metal case 5 so that the lamp housing covers a whole structure of the device. The lamp housing 15 has an opening 15a where a cover 16 made of resin is mounted so that it may be removed easily when necessary.

Now, operation of the device shown in FIG. 1 will be described. Upon turning on a lighting switch of a vehicle, the control circuit 6 begins to operate and supplies a high starting voltage of about 20 kV to the high voltage electric-discharge lamp 1. An arc-discharge is initiated in the lamp by the high starting voltage, that is, the discharge lamp 1 is lit by the starting voltage. Once the arc-discharge is initiated, the control circuit 6 stops supplying the high starting voltage and in turn begins to supply electric energy necessary to maintain the arc-discharge. The energy necessary to keep the discharge lamp lit is about 38 watts. In the case when the discharge lamp 1 is driven by an alternating voltage with a square wave form, the voltage is, for example, about 90 volts, and the current is about 0.4 A.

The light emitted forward from the discharge lamp 1 is intercepted by the shade 8A. Only the light emitted toward the reflector 7 is reflected on the front surface 7a of the reflector 7 and projected forward with a predetermined light distribution pattern.

As mentioned above, the discharge lamp 1 emits electromagnetic noises having frequencies of several-tens MHz every time polarities of the voltage alternate. The electromagnetic noises emitted directly forward from the discharge lamp 1 are shielded by the shade 8A, because the shade 8A intercepts a forward path and is grounded. The shade 8A is grounded through two grounding passages. A first one is a passage through the conical surface 8a, the support plate 8b, the metal ring plate 10, the metal clip 12, the metallic shielding sleeve 3, and the metal case 5. A second one is a passage through conical surface 8a, support plate 8b, the grounding terminals $8c_1$ and $8c_2$, the wire connecting the grounding terminals to the metal ring plate (not shown in the drawing), the metal ring plate 10, the metal clip 12, the metallic shielding sleeve 3, and the metal case 5. Thus, the electromagnetic noises emitted directly forward are shielded by the shade 8A, and an amount of the noises projected through the shade 8A is sufficiently decreased.

The electromagnetic noises emitted from the discharge lamp 1 toward the reflector 7 are also shielded by the reflector 7, because the reflector 7 itself is made of a metallic material or at least coated by a metallic material and grounded. The grounding passage is constituted by the reflector 7, the support plate 8b, the metal ring plate 10, the metal clip 12, the metallic shielding sleeve 3, and the metal case 5. Therefore, an amount of noises projected outside through the reflector 7 is reduced.

The electromagnetic noises are also emitted from the connector 2 and the wiring cable 4. The noises from the connector 2 are shielded by the metal cover 13 which is grounded through the metal ring plate 10, metal clip 12, the metallic shielding sleeve 3 and the metal case 5. The noises from the wiring cable 4 is shielded by the metallic shielding sleeve 3 which is grounded through the metal case 5. Therefore, an amount of noise projected outside through the metal cover 13 and the metallic shielding sleeve 3 is decreased. Noise emitted from the control circuit 6 is also shielded by the metal case 5 which is grounded. Accordingly, an amount of noise projected outside through the metal case 5 is decreased.

The electromagnetic noise emitted outside from a whole device are well suppressed in the manner mentioned above, and accordingly electromagnetic interference with radios and televisions is sufficiently eliminated.

The grounding terminals $8c_1$ and $8c_2$ constituting the second grounding passage are made in a shape of thin wire extending in parallel to a longitudinal direction of the discharge lamp 1. Therefore, the terminals hardly interfere with the light emitted from the discharge lamp 1 toward the reflector 7. Though a pair of the grounding terminals are made in the particular embodiment shown in FIG. 2, the number of the terminals may be variably chosen. For example, the number of the terminals may be one or three. However, the higher the number becomes, the more the noise can be suppressed according to experiments. Also, experiments show that it is preferable to dispose the terminals with equal intervals with respect to a peripheral circle of the discharge lamp 1 in case plural terminals are made.

Figure 3:
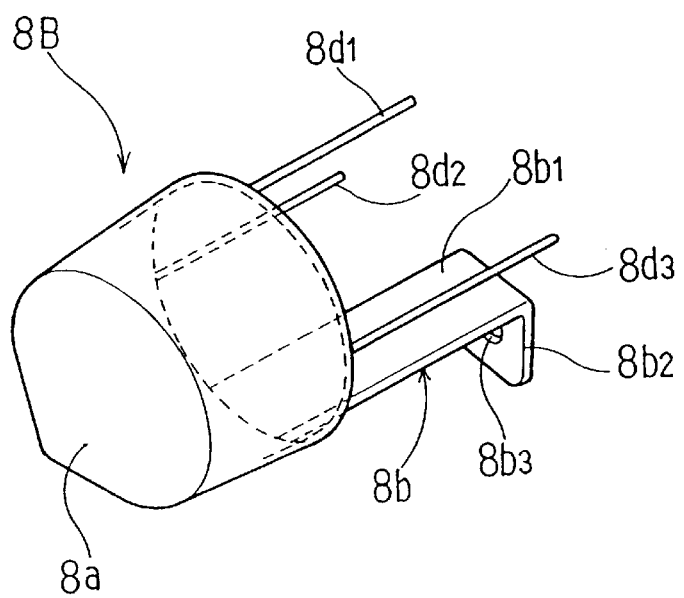
FIG. 3 is a perspective view showing a first modification of the shade shown in FIG. 2.

FIG. 3 shows a first modification of the shade 8A shown in FIG. 2. In FIG. 3 it is shown as a shade 8B. In place of the grounding terminals $8c_1$, and $8c_2$, three grounding terminals $8d_1$, $8d_2$, and $8d_3$ sticking out backward directly from the conical surface 8a of the shade 8B are made in this modification. The second grounding passage mentioned above is similarly formed in this modification, too. The number of terminals may be variably chosen. It may be, for example, one, two or more.

Figure 4:
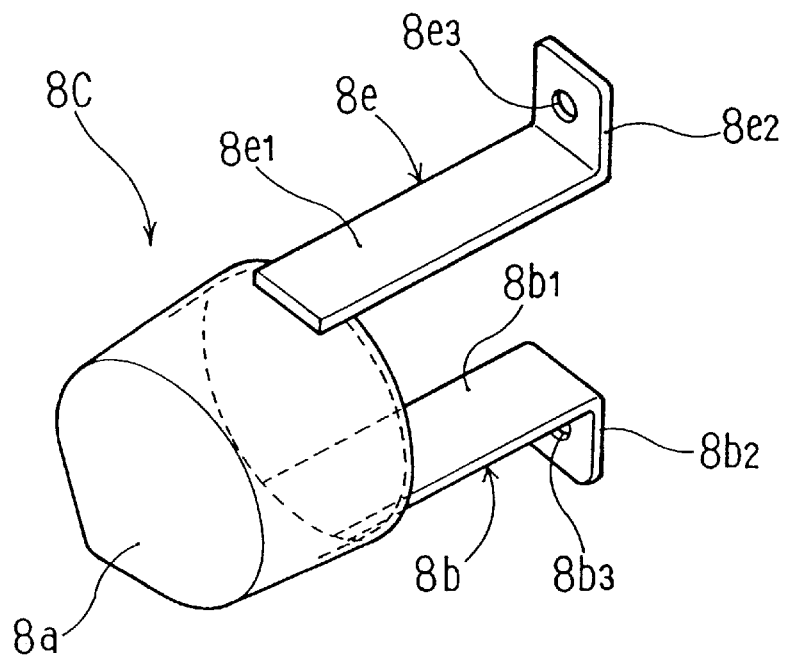
FIG. 4 is a perspective view showing a second modification of the shade shown in FIG. 2.

FIG. 4 shows a second modification of the shade, in which it is shown as a shade 8C. In this modification, the grounding terminals are eliminated, instead, an additional support plate 8e is connected to the conical surface 8a. The shade 8C is fixed to the back surface 7e and 7f via two support plates 8b and 8e, respectively. The shade 8C is also connected electrically to the reflector 7. The number of the support plates may be variably chosen.

Figure 5:
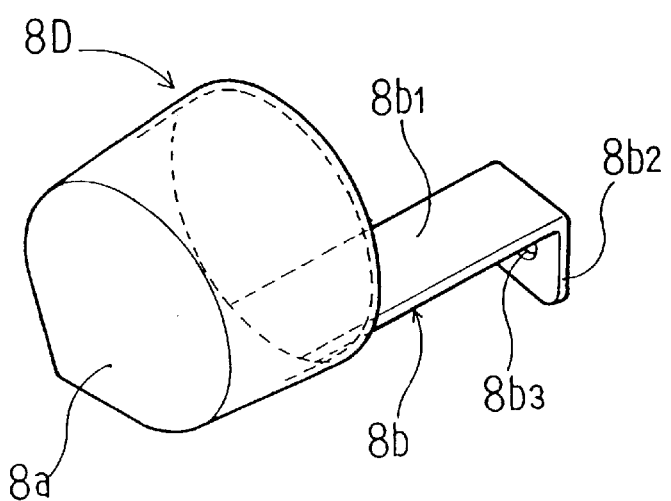
FIG. 5 is a perspective view showing a third modification of the shade shown in FIG. 2.

FIG. 5 shows a third modification of the shade, in which it is shown as a shade 8D. The shade 8D has only one support plate 8b which has no grounding terminals, and is fixed to the back surface 7e of the reflector 7 with the single support plate 8b.

Experiments for measuring the noise level have been carried out, in which an antenna is placed in front of the discharge lamp 1 with a distance of 30 cm. According to experiments, the noise level of the device in which the conical surface 8a is grounded is reduced by about 10–20 dBm for a frequency range of FM radio and television, and about 10 dBm for a frequency range of FM radio, compared with the noise level of the device in which the conical surface is not grounded.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A headlight device comprising:
    a high voltage electric-discharge lamp having a shape elongated in a direction from front to back;
    a reflector having a curved surface for reflecting light emitted from the high voltage electric-discharge lamp, the reflector being disposed to include the high voltage electric-discharge lamp within a space in front of the curved surface;
    a control circuit for energizing the high voltage electric-discharge lamp; and
    a shade covering a front side of the high voltage electric-discharge lamp for intercepting light emitted directly forward from the high voltage electric-discharge lamp and at least one support plate connected to the shade for mounting the shade on the reflector, wherein at least a part of said shade and the support plate are made of a metallic material that is not electrically connected to a high voltage side of the electric-discharge lamp, and said part of said shade is grounded through the support plate to intercept electromagnetic noise emitted forward from the high voltage electric-discharge lamp.

2. A headlight device according to claim 1, wherein at least one wire-like grounding terminal extends backward from the conical surface of the shade, and the conical surface of the shade is grounded through the grounding terminal.

3. A headlight device according to claim 1, wherein at least the curved surface of the reflector is made of a metallic material and grounded.

4. A headlight device according to claim 1 wherein said shade has a conical surface which is said part that is made of metallic material.

5. A headlight device according to claim 1 wherein said shade is made of a metallic material.

6. A headlight device according to claim 1, wherein:
    the light emitted from the high voltage electric-discharge lamp backward toward the reflector is reflected by the reflector and projected forward with a predetermined light distribution pattern.

7. A headlight device according to claim 3, wherein the support plate further includes at least one wire-like grounding terminal extending backward from the support plate, and the conical surface of the shade is grounded through the grounding terminal.

8. A headlight device according to claim 1 wherein said reflector is made of a resin and the surface thereof is covered by an aluminum film, said aluminum film being grounded through a metal case containing the control circuit.

9. A headlight device according to claim 1 wherein said shade and support plate are both made of a metallic material, wherein said support plate is mechanically connected to a rear side of said reflector and electrically connected to an aluminum film covering said reflector.

10. A headlight device according to claim 1 wherein said support plate is connected to said shade and extends backward from the shade, and
    wherein said support plate includes grounding terminals which extend to a rear side of said reflector and are electrically connected to an aluminum film covering said reflector.

11. A headlight device according to claim 1, 7, 2, 3 wherein the device further comprises a connector, for electrically connecting the high voltage electric-discharge lamp to the control circuit, attached to the high voltage electric-discharge lamp, and the connector is covered with a metal cover which is grounded.

12. A headlight device according to claim 11, wherein:
    the control circuit is contained in a grounded metal case;
    the connector is electrically connected through a wiring cable covered with a metallic shielding sleeve which is electrically connected to the grounded metal case; and
    the support plate, the reflector and the metal cover are all electrically connected to the metallic shielding sleeve.

13. A headlight device comprising:
    a high voltage electric-discharge lamp having a shape elongated in a direction from front to back;
    a reflector having a curved surface for reflecting light emitted from the high voltage electric-discharge lamp, the reflector being disposed to include the high voltage electric-discharge lamp within a space in front of the curved surface, and having a through-hole for a support plate to pass through;
    a control circuit for energizing the high voltage electric-discharge lamp; and
    a shade covering a front side of the high voltage electric-discharge lamp for intercepting light emitted directly forward from the high voltage electric-discharge lamp and at least one support plate connected to the shade and extending backward from the shade and through said through-hole in the reflector to mechanically connect on a rear side of the reflector, wherein at least a part of said shade and the support plate are made of a metallic material that is not electrically connected to a high voltage side of the electric-discharge lamp, and said part of said shade is grounded through the support plate to a rear side of the reflector and not through a connector for the high voltage electric-discharge lamp to thereby intercept electromagnetic noise emitted forward from the high voltage electric-discharge lamp.

* * * * *